UNITED STATES PATENT OFFICE.

CHARLES SORLEY, OF NEW YORK, N. Y., ASSIGNOR TO THE ANGLO-AMERICAN ELECTRIC-LIGHT MANUFACTURING COMPANY, OF WEST VIRGINIA.

TREATMENT OF STORAGE-BATTERY PLATES.

SPECIFICATION forming part of Letters Patent No. 422,457, dated March 4, 1890.

Original application filed November 12, 1889, Serial No. 330,052. Divided and this application filed December 19, 1889. Serial No. 334,330. (No model.)

*To all whom it may concern:*

Be it known that I, CHARLES SORLEY, of the city, county, and State of New York, have invented a new and useful Improvement in Treating Storage-Battery Plates, of which the following is a specification.

It is well known that when the support or grid of a storage-battery plate is packed with active material in a dry pulverized state and then placed suddenly in the electrolyte of the cell gas forms between the particles of said active material and blows out or detaches the same from the support. To avoid this difficulty the active material is either combined directly with a liquid, and so made into a paint, paste, or cement, and in this condition placed in the support and there allowed to set or harden, or else after the plate is packed the active material therein is moistened with fluid and a setting of the material produced before the plate is immersed in the battery-electrolyte.

By the process which constitutes my present invention a perfectly dry powder is compacted into the grid or support by suitable pressure, hydraulic or otherwise, and the plate is at once immersed in the battery-fluid in the battery in which said plate is used, no other liquid being applied to said plate and no previous setting of the active material being by any other means produced.

In another application for Letters Patent filed November 12, 1889, Serial No. 330,052, of which this application is a division, I have broadly claimed the method of treating storage-battery plates, which consists, first, in packing a grid, support, or electrode with active material in a dry pulverulent state, and then gradually and slowly immersing said plate in an electrolyte; and as one means of carrying into effect my said process I have specifically described in said application the lowering of the plate into the electrolyte previously placed in the cell.

My present application relates to a specific mode of immersion—namely, by first placing the electrode in the cell and then gradually and slowly introducing an electrolytic liquid therein.

I carry my process into effect as follows: I first pack in the grid, support, or plate active material in the form of a dry powder, using hydraulic, hand, or other suitable pressure to insure compactness. I then place the plate in the cell or battery in which it is to be used. I then allow the electrolytic liquid to flow into the cell slowly, either pouring the liquid into said cell or conducting it therein by a siphon reaching nearly to the bottom of the cell. This slow and gradual immersion of the packed plate is essential, and its result is the complete prevention of the detaching or disintegration of the active material by the action of contained air or generated gas. Instead of the air or gas being imprisoned in the active material, as is the case when the plate, as it is commonly, is rapidly immersed in the liquid, the gradual and slow rise of the liquid around said plate allows time for the thorough infiltration of the fluid and the gradual expulsion of air or escape of gas from the mass of active material as the liquid-level on the plate rises.

The rate at which the liquid should be allowed to cover the plate is easily determined by experiment for plates of any given dimensions. If the immersion is too rapid, the active material will be seen to disintegrate; but this effect will cease as soon as the immersion is reduced to the proper speed. After that point is reached greater slowness is immaterial, though usually advantageous.

In order to exhibit one practical and operative mode in which my invention may be carried into practice to produce beneficial results, I will state that I find that the liquid should be allowed to rise on the plate at the rate of six inches per minute. This is the fastest rate of speed. A lower one is, however, beneficial; or, in other words, the result will be better the more slowly the immersion takes place, and therefore the time may be increased to one or two hours with advantage.

I claim—

The method of treating storage-battery plates which consists, first, in packing a grid, support, or electrode with active material in a dry pulverulent state, then placing said electrode in a cell, then gradually and slowly introducing an electrolytic liquid into said cell, and then charging said electrode in said liquid.

CHARLES SORLEY.

Witnesses:
S. O. EDMONDS,
M. BOSCH.